(12) United States Patent
Masahiro et al.

(10) Patent No.: US 6,387,845 B1
(45) Date of Patent: May 14, 2002

(54) CARBON DIOXIDE GAS ABSORBENT CONTAINING LITHIUM SILICATE

(75) Inventors: Kato Masahiro, Naka-gun; Kazuaki Nakagawa, Yokohama; Toshiyuki Ohashi, Kawasaki; Sawako Yoshikawa; Kenji Essaki, both of Yokohama, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/527,229

(22) Filed: Mar. 16, 2000

(30) Foreign Application Priority Data

| Mar. 23, 1999 | (JP) | 11-077199 |
| Sep. 30, 1999 | (JP) | 11-280667 |
| Dec. 17, 1999 | (JP) | 11-358956 |

(51) Int. Cl.⁷ .......................... B01J 20/10; C01B 33/32
(52) U.S. Cl. ..................... 502/407; 423/230; 423/332
(58) Field of Search .............. 423/332, 333, 423/334, 265, 275, 230; 502/407

(56) References Cited

U.S. PATENT DOCUMENTS

| 3,684,712 A | * 8/1972 | Bovard |
| 3,932,140 A | 1/1976 | Jayawant et al. |
| 4,042,482 A | * 8/1977 | Shannon et al. ............ 204/242 |
| 5,075,818 A | * 12/1991 | Ueno et al. ................. 361/321 |
| 5,298,475 A | * 3/1994 | Shibata et al. |
| 5,589,427 A | * 12/1996 | Donne et al. ................. 501/33 |
| 5,755,940 A | * 5/1998 | Shindo ........................ 204/424 |
| 5,866,090 A | 2/1999 | Nakagawa et al. |
| 5,925,180 A | * 7/1999 | Frank et al. .................... 106/35 |
| 6,085,015 A | * 7/2000 | Armand et al. ............. 385/140 |

FOREIGN PATENT DOCUMENTS

| DE | 198 42 228 | 3/1999 |
| GB | 2154222 | * 9/1985 |
| GB | 2 159 806 | 12/1985 |

OTHER PUBLICATIONS

Derwent Publications, AN 1999–584169, JP 11–253746, Sep. 21, 1999.

Kazuaki Nakagawa, et al., "A Novel $CO_2$ Absorbent Using Lithium Zirconate Ceramics", Chemistry and Chemical Industry, 52, 1998, pp. 285–287, no month.

K. Nakagawa, et al., "Chemical Absorption of Carbon Dioxide Using Lithium Zirconate (I)", Proc. Ann. Meet. of Electrochem. Soc. Jpn., 1997, No. 3F11, no month.

Ryuji Matsuhashi, et al., "A Study on the Efficient Removal of $CO_2$ from a Coal Gasification Combined Cycle Plant", T. IEE Japan, vol. 112–B, No. 6, 1992, pp. 531–537, no month.

A. M. Wolsky, et al., "Technologies for $CO_2$–Capture from Advanced Power–Generation Systems", U.S. Department of Energy Report, ANL/ES/CP/80346, 1993, pp. 1–19 with cover page, Aug.

Norio Miura, et al., "Stabilized Zirconia Based $CO_2$ Sensors Combined with Carbonate Auxiliary Phase", Chemistry Letters, The Chemical Society of Japan, 1994, pp. 393–396, no month.

T. Ohashi, et al., "Acceleration Effect of Potassium Carbonate on $CO_2$ Absorption in Lithium Zirconate Powder", Proc. Foll. Meet. Elect. Soc. Jpn., 1997, No. 2G31, no month.

K. Nakagawa, et al., "High Temperature $CO_2$ Absorption Using Lithium Transition Metal Oxide (I)", Pro. Foll. Meet. Elect. Soc. Jpn., 1997, No. 2G32, no month.

K. Nakagawa, et al., "A Novel Method of $CO_2$ Capture from High Temperature Gases", J. Electrochem. Soc., vol. 145, No. 4, Apr. 1998, pp. 1344–1346.

J. Tsubaki, "Current Inorganic Membrane Technology for Gas Separation and It's Application to Carbone Dioxide Separation", Membrane, vol. 19, No. 3, 1994, p. 146–154, no month.

T. Yoshida, et al., "Development of Molten Carbonate Fuel Cell (MCFC) Power Generation Technology", Ishikawajima–Harima Engineering Rev., vol. 27, No. 4, Oct., 1994, pp. 125–134.

K. Shoji, et al., Proc. of MCFC Seminar, 1993, pp. 45–54, no month.

* cited by examiner

*Primary Examiner*—Steven Bos
(74) *Attorney, Agent, or Firm*—Oblon, Spivak, McClelland, Maier & Neustadt, P.C.

(57) ABSTRACT

Disclosed is a carbon dioxide gas absorbent containing lithium silicate reacting with a carbon dioxide gas to form lithium carbonate and represented by the general formula, $Li_xSi_yO_z$, where x, y, z are integers meeting the requirement of $x+4y-2z=0$. The lithium content x in the general formula should desirably be at least 4.

28 Claims, 2 Drawing Sheets

US 6,387,845 B1

CARBON DIOXIDE GAS ABSORBENT CONTAINING LITHIUM SILICATE

CROSS-REFERENCE TO RELATED APPLICATIONS

This application is based upon and claims the benefit of priority from the prior Japanese Patent Applications No. 11-077199, filed Mar. 23, 1999; No. 11-280667, filed Sep. 30, 1999; and No. 11-358956, filed Dec. 17, 1999, the entire contents of which are incorporated herein by reference.

BACKGROUND OF THE INVENTION

The present invention relates to a carbon dioxide gas absorbent, particularly, to a carbon dioxide gas absorbent employed in an energy plant or a chemical plant that utilizes a hydrocarbon-based fuel, in a system for separating and recovering carbon dioxide gas from an exhaust gas of motor cars, or in a refining system of a gas supplied into a fuel supply section.

In an apparatus in which a hydrocarbon-based fuel is combusted such as an engine, the exhaust gas release portion adapted for recovery of a carbon dioxide gas is heated to a high temperature not lower than 300° C.

A method using cellulose acetate, a chemical absorption method using an alkanol amine-based solvent, etc. are known to the art as methods of separating a carbon dioxide gas. However, it is necessary to suppress the inlet gas temperature to a level not higher than 200° C. in any of these conventional methods. Therefore, for processing an exhaust gas requiring a gas recycle at high temperatures, the exhaust gas must be cooled once to temperatures not higher than 200° C. by using, for example, a heat exchanger. In the case of employing these conventional methods, a problem is brought about that the energy consumption for separating a carbon dioxide gas is increased.

On the other hand, Japanese Patent Disclosure (Kokai) No. 9-99214 discloses a carbon dioxide gas absorbent consisting of lithium zirconate that performs its function under high temperatures exceeding about 500° C. The method disclosed in this prior art is defective in that zirconium oxide, which is a matrix oxide forming lithium zirconate, is very heavy, with the result that the absorbent itself is rendered very heavy. In addition, it is difficult to absorb and recover a carbon dioxide gas from the exhaust gas of the entire temperature range.

Japanese Patent Disclosure No. 11-90219 discloses a carbon dioxide gas absorbent that reacts with a carbon dioxide gas at a temperature not higher than 450° C. to form lithium carbonate. The carbon dioxide absorbent disclosed in this prior art is a lithium oxide composition containing at least one element selected from the group consisting of aluminum, titanium, iron and nickel. Even in the case of using the particular carbon dioxide gas absorbent, the carbon dioxide absorption rate at about 250° C. is not sufficiently high.

Incidentally, the carbon dioxide gas absorption characteristics of lithium zirconate are not sufficiently satisfactory in every range of the carbon dioxide gas concentration. Particularly, lithium zirconate is incapable of sufficiently absorbing a carbon dioxide gas of a low concentration.

BRIEF SUMMARY OF THE INVENTION

An object of the present invention, which has been achieved for overcoming the above-noted problems inherent in the prior art, is to provide a lightweight carbon dioxide absorbent capable of maintaining a high performance that the absorbent performs its function under high temperature regions exceeding about 500° C.

Another object is to provide a carbon dioxide absorbent capable of exhibiting a high carbon dioxide gas absorbing capability under temperature regions in the vicinity of 250° C.

Further, still another object of the present invention is to provide a lightweight carbon dioxide gas absorbent capable of efficiently recovering a low concentration of a carbon dioxide gas under a high temperature region.

According to a first aspect of the present invention, there is provided a carbon dioxide gas absorbent containing lithium silicate represented by the general formula:

where x, y, z are integers meeting the requirement of x+4y−2z=0.

According to a second aspect of the present invention, there is provided a carbon dioxide gas absorbent containing as a main component a compound containing lithium and silicon and oxygen.

According to a third aspect of the present invention, there is provided a carbon dioxide gas absorbent containing a complex oxide of lithium and silicon and reacting with a carbon dioxide gas to form lithium carbonate.

According to a fourth aspect of the present invention, there is provided a carbon dioxide gas absorbent containing $Li_2O$ and $SiO_2$, the molar ratio of $Li_2O/SiO_2$ falling within a range of between 0.5 and 10.

According to a fifth aspect of the present invention, there is provided a carbon dioxide gas absorbent containing a lithium silicate powder having an average particle diameter of 0.1 to 50 μm.

According to a sixth aspect of the present invention, there is provided a carbon dioxide gas absorbent containing lithium silicate and at least one kind of alkali carbonate selected from the group consisting of sodium carbonate and potassium carbonate.

According to a seventh aspect of the present invention, there is provided a carbon dioxide gas absorbent containing lithium silicate and lithium zirconate.

According to other aspect of the present invention, there is provided a method of separating a carbon dioxide gas from a gaseous material containing a carbon dioxide gas, wherein a carbon dioxide gas absorbent defined above is brought into contact with a gaseous material containing a carbon dioxide gas.

According to further aspect of the present invention, there is provided a method of separating a carbon dioxide gas, wherein a carbon dioxide gas absorbent absorbing a carbon dioxide gas is heated.

According to further aspect of the present invention, there is provided an apparatus for separating a carbon dioxide gas, comprising a reaction vessel equipped with a carbon dioxide inlet port and a formed gas outlet port, a carbon dioxide gas absorbent defined above loaded in the reaction vessel, and heating means arranged to surround the outer surface of the reaction vessel for heating the reaction vessel.

According to further aspect of the present invention, there is provided a combustion apparatus for combusting a hydrocarbon-based fuel, comprising a carbon dioxide gas absorbent defined above arranged in an exhaust passageway of a carbon dioxide gas generated by the combustion of the hydrocarbon.

Further, according to other aspect of the present invention, there is provided a method of manufacturing a carbon dioxide gas absorbent, comprising the steps of preparing a lithium silicate powder, and adding at least one kind of an alkali carbonate powder selected from the group consisting of a sodium carbonate powder and a potassium carbonate powder to the lithium carbonate powder.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
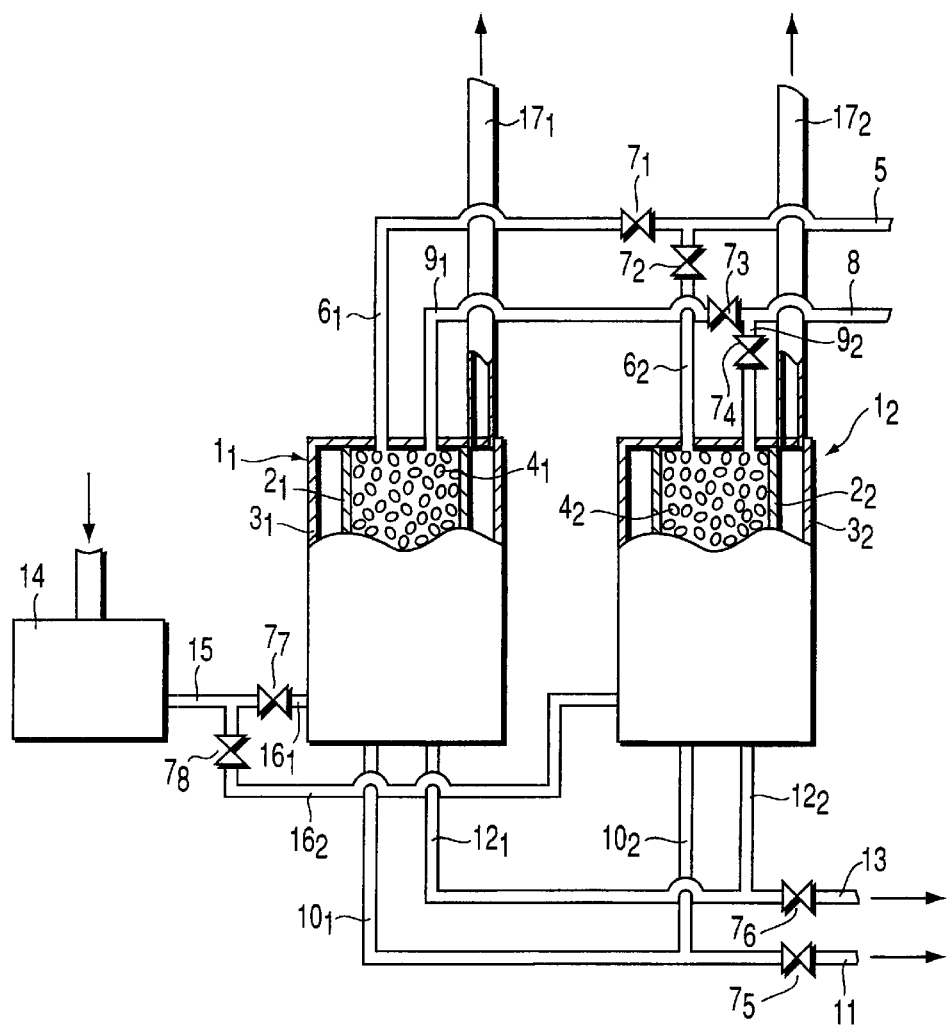
FIG. 1 schematically shows a carbon dioxide gas separating apparatus using a carbon dioxide gas absorbent of the present invention.

The present inventors have found that a material containing lithium silicate is effective for decreasing the weight of a carbon dioxide gas absorbent, arriving at the present invention.

According to a first embodiment of the present invention, provided is a carbon dioxide gas absorbent containing lithium silicate represent by the general formula:

$Li_xSi_yO_z$ 

where x, y, z are integers meeting the requirement of x+4y−2z=0.

It is desirable for x in the general formula to be at least 4.

It is possible to add an alkali carbonate selected from the group consisting of lithium carbonate, sodium carbonate and potassium carbonate to the lithium silicate noted above. The carbon dioxide absorption-release rate of the absorbent is promoted by the addition of the alkali carbonate. The alkali carbonate should desirably be added in an amount of 5 to 30 mol % based on the amount of lithium silicate. If the addition amount of the alkali carbonate is smaller than 5 mol %, it is difficult to promote sufficiently the carbon dioxide gas absorbing reaction. On the other and, where the addition amount of the alkali carbonate exceeds 30 mol %, the promoting effect of the carbon dioxide gas absorbing reaction is likely to be saturated. Further, the carbon dioxide gas absorbing amount per unit volume of the absorbent tends to be lowered. More preferably, the alkali carbonate should be added in an amount of 10 to 20 mol % based on the amount of lithium silicate.

It is desirable for the carbon dioxide gas absorbent of the present invention, which contains lithium silicate, to be in the form of a porous body consisting of particles having an average particle diameter of 0.1 to 5.0 mm. Where the average particle diameter of the particles is not larger than 0.1 mm, it would be difficult to form a molded body without adding binder. On the other hand, where the average particle diameter exceeds 5.0 mm, deterioration of mechanical strength would be caused.

It is desirable for the porous body to have a porosity of 30 to 50%. Where the porosity is smaller than 30%, it would be difficult to obtain sufficient passageway for flowing carbon dioxide gas. On the other hand, if the porosity exceeds 50%, deterioration of mechanical strength would be caused. Where the carbon dioxide gas absorbent contains the alkali carbonate, the alkali carbonate is held within the pores of the porous body.

The carbon dioxide gas absorbent of the porous structure is manufactured, for example, as follows.

In the first step, predetermined amounts of silicon dioxide and lithium carbonate are weighed and mixed in an agate mortar for 0.1 to 1 hour. The mixed powder thus prepared is put in an alumina crucible and subjected to a heat treatment for 0.5 to 20 hours within, for example, a box-shaped electric furnace under the air atmosphere. Then, the heat-treated powder is put again in the agate mortar so as to be pulverized until the average powder particle is diminished to 0.1 to 5.0 mm, thereby to obtain a lithium silicate raw material powder. Then, a predetermined amount of the lithium silicate powder is weighed and put in a mold so as to be subjected to a compression molding, thereby to obtain a molding having a porosity of about 40%, e.g., 35 to 45%. The molding thus prepared is used as a carbon dioxide gas absorbent having a porous structure.

The lithium silicate represented by the general formula $Li_xSi_yO_z$, wherein x, y, z are integers meeting the relationship of x+4y−2z=0, reacts with a carbon dioxide gas to form lithium carbonate as shown by the reaction formula (1) given below:

$$Li_xSi_yO_z + x/2 CO_2 \rightarrow x/2 Li_2CO_3 + y SiO_2 \quad (1)$$
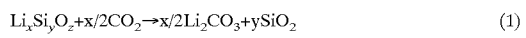

Also, the reaction reverse to the reaction given by the reaction formula (1) also takes place, if the reaction system is heated to exceed a specified temperature, as indicated in reaction formula (2) given below:

$$x/2 Li_2CO_3 + y SiO_2 \rightarrow Li_xSi_yO_z + x/2 CO_2 \quad (2)$$
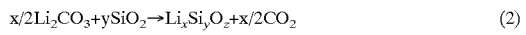

Lithium silicate is lightweight, compared with the conventional lithium zirconate. Particularly, where x in the general formula of lithium silicate is 4 or more, 1 mol of lithium silicate is capable of absorbing at least 2 mols of carbon dioxide. It follows that the carbon dioxide gas absorption amount per unit weight of the carbon dioxide absorbent is markedly improved.

A carbon dioxide gas absorbent capable of performing the absorption-release reactions of carbon dioxide more efficiently can be obtained by further adding a carbonate of an alkali metal selected from lithium, sodium and potassium to the absorbent.

It is possible for the carbon dioxide gas absorbent of the present invention to contain as an auxiliary component at least one additional element selected from the group consisting of Al, K, Mg, Ca, Na, Fe, Ti and C. The presence of the additional element serves to improve absorving rate. It should be noted, however, that the amount of the additional element should desirably be not larger than 5 wt %, more preferably not larger than 1 wt %. If the amount of the additional component exceeds 5 wt %, component phase not contributing absorption of carbon dioxide gas would be produced.

The carbon dioxide gas absorbent according to one embodiment of the present invention, which is described above, can be said to be a carbon dioxide gas absorbent containing Li, Si and O as main components. The carbon dioxide gas absorbent can also be said to be a carbon dioxide gas absorbent containing a complex oxide of lithium and silicon and forming lithium carbonate upon reaction with a carbon dioxide gas.

The absorbent of the present invention can also be said to be a carbon dioxide gas absorbent containing $Li_2O$ and $SiO_2$ in which the $Li_2O/SiO_2$ molar ratio falls within a range of between 0.5 and 10. Where the ratio is smaller than 0.5, it would be difficult to react $SiO_2$ completely. On the other hand, where the ratio exceeds 10, $Li_2O$ would remain. It is desirable for $Li_2O/SiO_2$ molar ratio to fall within a range of between 1 and 3.

It is possible for the carbon dioxide gas absorbent of the present invention to contain lithium zirconate. Lithium zirconate is excellent in its cycle life characteristics. In other words, lithium zirconate can be used repeatedly over a long period of time. Therefore, where the carbon dioxide gas absorbent of the present invention contains lithium zirconate, the cycle life characteristics of the absorbent can be improved. It should be noted, however, that the lithium zirconate content of the absorbent should desirably be not higher than 40 mol % in order to prevent the effect produced by lithium silicate from being impaired. Preferably, the lithium zirconate content of the absorbent should be not higher than 30 mol %.

FIG. 1 is a cross sectional view schematically showing the construction of a carbon dioxide gas separating apparatus using the carbon dioxide gas absorbent of the present invention described above. As shown in the drawing, the apparatus for separating a carbon dioxide gas includes a first absorption tower $1_1$ and a second absorption tower $1_2$. The first absorption tower $1_1$ is of a double wall structure consisting of an inner tube $2_1$ and an outer tube $3_1$ arranged outside the inner tube $2_1$. The second absorption tower $1_2$ is also of a double wall structure consisting of an inner tube $2_2$ and an outer tube $3_2$ arranged outside the inner tube $2_2$. These outer tubes $3_1$, $3_2$ serve to supply heat to the inner tubes $2_1$, $2_2$, respectively.

Lithium silicate used as the carbon dioxide gas absorbent of the present invention can be used in the form of thin pieces. Lithium silicate thin pieces $4_1$, $4_2$ are loaded in the inner tubes $2_1$, $2_2$ of the first and second absorption towers $1_1$, $1_2$, respectively.

Branched pipes $6_1$, $6_2$ branched from a gas supply pipe 5 for supplying a gas containing a carbon dioxide gas are connected to the upper portions of the inner tubes $2_1$, $2_2$ of the first and second absorption towers $1_1$, $1_2$, respectively. A first valve $7_1$ and a second valve $7_2$ are mounted to the branched pipes $6_1$, $6_2$, respectively.

Branched pipes $9_1$, $9_2$ branched from a pipe 8 for supplying a gas for recovering a carbon dioxide gas are connected to the upper portions of the inner tubes $2_1$, $2_2$ of the absorption towers $1_1$, $1_2$, respectively. A third valve $7_3$ and a fourth valve $7_4$ are mounted to the branched pipes $9_1$, $9_2$, respectively.

Branched gas discharge pipes $10_1$, $10_2$ are connected to the lower portions of the inner tubes $2_1$, $2_2$ of the absorption towers $1_1$, $1_2$, respectively. The other ends of these branched pipes $10_1$, $10_2$ are connected to a treated gas discharge pipe 11 having a fifth valve $7_5$ mounted thereto.

Further, branches pipes $12_1$, $12_2$ for discharging the recovered gas are connected to the lower portions of the inner tubes $2_1$, $2_2$ of the absorption towers $1_1$, $1_2$, respectively. The other ends of these branched pipes $12_1$, $12_2$ are connected to a recovered gas discharge pipe 13 having a sixth valve $7_6$ mounted thereto.

A combusting device 14 for combusting a fuel gas is arranged adjacent to the first absorption tower $1_1$. One end of a combustion gas supply pipe 15 is connected to the combusting device 14, and first and second branched pipes $16_1$, $16_2$ branched from the combustion gas supply pipe 15 for supplying the combustion gas are connected to the lower portions of the side walls of the outer tubes $3_1$, $3_2$ of the absorption towers $1_1$, $1_2$, respectively. A seventh valve $7_7$ and an eighth valve $7_8$ are mounted to the first and second branched pipes $16_1$, $16_2$, respectively. Further, first and second discharge pipes $17_1$, $17_2$ are connected to the upper portions of the first and second absorption towers $1_1$, $1_2$ in a manner to communicate with the annular spaces defined between the inner tubes $2_1$, $2_2$ and the outer tubes $3_1$, $3_2$ respectively.

If a fuel is combusted within the combusting device 14, the combustion gas is supplied to the annular spaces of the absorption towers $1_1$, $1_2$ through the combustion gas supply pipe 15 and the first and second branches pipes $16_1$, $16_2$, respectively. Then, the combustion gas flowing through these annular spaces is discharged to the outside through the first and second discharge pipes $17_1$, $17_2$. While the combustion gas flows through the annular spaces, the lithium silicate thin pieces $4_1$, $4_2$ loaded in the inner tubes $2_1$, $2_2$ are heated.

It should be noted that, where a carbon dioxide gas contained in a raw material gas is absorbed by the carbon dioxide gas absorbent, it is desirable to set the heating temperature at about 450 to 700° C. On the other hand, where a carbon dioxide gas is separated from the carbon dioxide gas absorbent absorbing the carbon dioxide gas, it is desirable to set the heating temperature at about 710 to 800° C.

It is desirable for the molar amount per hour of the gas circulated through the inner tubes $2_1$, $2_2$ of the absorption towers $1_1$, $1_2$ should desirably be 4 to 50 times as much as the molar amount of the lithium silicate thin pieces $4_1$, $4_2$ loaded in the inner tubes $2_1$, $2_2$. If the molar amount per hour of the circulated gas exceeds 50 times as much as the molar amount of the loaded lithium silicate thin pieces, it is difficult to achieve the carbon dioxide gas absorption efficiently in view of the volume utilization rate of the absorption towers $1_1$, $1_2$. On the other hand, where the molar amount per hour of the circulated gas is smaller than 4 times as much as the molar amount of the loaded lithium silicate powder, the heat generation accompanying the absorbing reaction is rendered excessively large so as to elevate the temperature of the circulating gas. As a result, the carbon dioxide gas absorbing reaction itself tends to be impaired. In view of both the utilization efficiency of the absorption tower and the prompt progress of the absorption reaction, it is desirable to set the molar amount per hour of the circulated gas should preferably be set at 8 to 30 times as much as the molar amount of the lithium silicate powder loaded in the absorption towers.

The absorption and recovery of a carbon dioxide gas can be carried out continuously by alternately carrying out reactions (1) and (2) given previously within the inner tubes $2_1$, $2_2$, in which lithium silicate thin pieces $4_1$, $4_2$ are loaded, of the two absorption towers $1_1$, $1_2$ in accordance with procedures (1-1) and (1-2) given below:

(1-1) Operation for Absorbing Carbon Dioxide Gas in the First Absorption Tower $1_1$:

In the first step, the first valve $7_1$ mounted to the first branched pipe $6_1$ connected to the inner tube $2_1$ of the first absorption tower $1_1$ and the fifth valve $7_5$ mounted to the treated gas discharge pipe 11 are opened, and the remaining valves $7_2$, $7_3$, $7_4$, $7_6$, $7_7$, and $7_8$, are closed. Then, a gas containing a carbon dioxide gas is supplied from the gas supply pipe 5 into the inner tube $2_1$ of the first absorption tower $1_1$ through the first branched pipe $6_1$. In this step, the molar amount per hour of the gas circulated into the inner tube $2_1$ of the first absorption tower $1_1$ should be set at 4 to 50 times as much as the molar amount of the lithium silicate thin pieces $4_1$ loaded in the inner tube $2_1$, as described previously. As a result, the carbon dioxide gas contained in the circulated gas carries out the reaction with the lithium silicate thin pieces $4_1$ in accordance with the reaction formula (1) given previously so as to permit the carbon dioxide gas to be absorbed by and held in the lithium silicate thin pieces promptly. The gas with a lower carbon dioxide concentration is discharged to the outside through the first branched pipe $10_1$ and the treated gas discharge pipe 11.

The absorption of the carbon dioxide gas within the second absorption tower $1_2$ is performed by an operation similar to that described above.

(1-2) Operation for Recovering Carbon Dioxide Gas from the Second Absorption Tower $1_2$:

During the above-described operation for absorbing a carbon dioxide gas performed within the first absorption tower $1_1$, the fourth valve $7_4$ mounted to the second branched pipe $9_2$ connected to the second absorption tower $1_2$, the sixth valve $7_6$ mounted to the recovered gas discharge pipe 13, and the eighth valve $7_8$ mounted to the second branched pipe $16_2$ for supplying the combustion gas are opened.

Then, the combusting gas generated from the combustion device 14 is supplied to the annular space defined between the inner tube $2_2$ and the outer tube $3_2$ through the combustion gas supply pipe 15 and the second branched pipe $16_2$ for supplying the combustion gas. As a result, the lithium silicate thin pieces $4_2$ loaded in the inner tube $2_2$ of the second absorption tower $1_2$ is heated to temperatures not lower than 800° C. At the same time, a desired gas for recovering is supplied from the recovering gas supply pipe 8 into the inner tube $2_2$ of the second absorption tower $1_2$ through the second branched pipe $9_2$.

In this case, the carbon dioxide gas that has already been absorbed by the lithium silicate thin pieces $4_2$ is promptly released from the lithium silicate thin pieces $4_2$ by the reaction carried out in accordance with the reaction formula (2) given previously. The gas containing a high concentration of the carbon dioxide gas is recovered through the branched pipe $12_2$ for discharging the recovered gas and the recovered gas discharge pipe 13.

Recovery of the carbon dioxide gas from the first absorption tower $1_1$ is also performed by the similar operation.

The operations described above are repeatedly performed so as to achieve a continuous separation of a carbon dioxide gas.

It is possible to use a metal such as a high density alumina and nickel, or iron for forming the inner tubes $2_1$, $2_2$, the outer tubes $3_1$, $3_2$ the branched pipes $6_1$, $6_2$ for supplying a gas containing a carbon dioxide gas, the branched pipes $9_1$, $9_2$ for supplying the gas for recovery, the branched pipes $10_1$, $10_2$ for discharging the gas and branched pipes $12_1$, $12_2$ for discharging the recovered gas. For efficiently recovering the carbon dioxide gas formed within the reaction vessels, it is desirable for the outer tube to have a large inner volume. Further, in order to allow the combustion gas to be kept in contact with the lithium silicate thin pieces $4_1$, $4_2$ for a long time, it is desirable for each of the inner tubes $2_1$, $2_2$ and the outer tubes $3_1$, $3_2$ to be in the shape of a long tube extending in the gas flowing direction.

It should also be noted that, depending on the reaction temperature of the raw material gas, it is possible to mount within or outside the reaction vessel a temperature control means for setting the temperature within the reaction vessel at a predetermined temperature, as desired.

Figure 2:
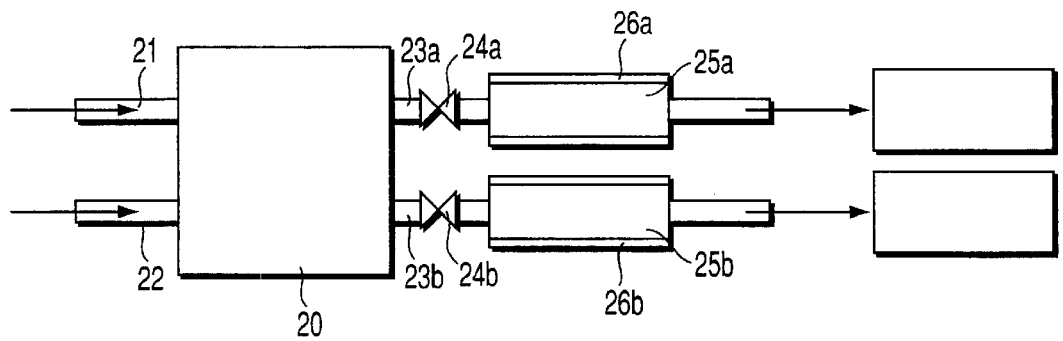
FIG. 2 exemplifies the construction of a carbon dioxide gas separating system in which a carbon dioxide gas absorbent of the present invention is applied to a thermal power generation plant.

The carbon dioxide gas absorbent of the present invention containing lithium silicate can be used in a thermal power station for directly absorbing the carbon dioxide gas contained in the waste gas after combustion of the fuel. FIG. 2 schematically shows as an example such a carbon dioxide gas separating system.

In the carbon dioxide gas separating system shown in FIG. 2, the fuel and the air are introduced into a gas turbine 20 through a fuel introducing pipe 21 and an air introducing pipe 22. The gas containing a carbon dioxide gas, which is generated within the gas turbine 20 is introduced into first and second carbon dioxide gas separating cylinders 25a, 25b through pipes 23a, 23b for supplying a gas containing a carbon dioxide gas, respectively. The supply of the carbon dioxide-containing gas into the first and second carbon dioxide gas separating cylinders 25a, 25b can be controlled by absorption-release switching valves 24a, 24b, respectively.

As shown in the drawing, the first and second carbon dioxide gas separating cylinders 25a, 25b are surrounded by heat generating members 26a, 26b, respectively. The carbon dioxide gas can be absorbed or released by heating the heat generating members 26a, 26b to predetermined temperatures.

As described above, it is possible to obtain a carbon dioxide gas separating apparatus simple in construction and capable of continuously separating-recovering a carbon dioxide gas at a low cost by using the carbon dioxide gas absorbent according to one embodiment of the present invention.

A second embodiment of the present invention will now be described.

Specifically, the second embodiment is directed to a carbon dioxide gas absorbent containing a lithium silicate powder having an average particle diameter of 0.1 to 10 μm. By using a lithium silicate powder having a particle diameter falling within the range specified in the present invention, it is possible to absorb sufficiently a carbon dioxide gas under a relatively low temperature region of about 250° C.

Lithium silicate used in this embodiment is represented by $Li_xSi_yO_z$, where x+4y−2z=0. A desirable lithium silicate is $Li_4SiO_4$.

The present inventors have found that lithium silicate carries out reaction with carbon dioxide under a temperature region of about 250° C., as denoted by reaction formula (3) given below, so as to obtain a carbon dioxide gas absorbent exhibiting a high carbon dioxide absorbing power under a relatively low temperature region of about 250° C.:

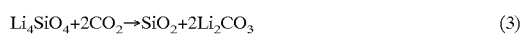

$$Li_4SiO_4+2CO_2 \rightarrow SiO_2+2Li_2CO_3 \qquad (3)$$

In the lithium silicate powder particle, lithium (Li) is diffused from within the lithium silicate powder particle to the surface, and the lithium diffused to the surface performs a reaction with a carbon dioxide gas so as to absorb the carbon dioxide gas. Since the diffusion rate of lithium tends to be lowered under a relatively low temperature (about 250°

C.), it is effective to diminish the particle diameter of the lithium silicate powder so as to shorten the diffusing distance of lithium. Such being the situation, the upper limit of the average particle diameter of the lithium silicate powder is set at 10 μm. On the other hand, if the particle diameter of the powder is excessively small, the powder tends to be agglomerated, with the result that the effective average diameter is not diminished. Further, the carbon dioxide gas absorbing characteristics tend to be lowered by the presence of the newly generated interfaces. In order to avoid these inconveniences, the lower limit of the average particle diameter of the lithium silicate powder is set at 0.1 μm. Incidentally, the average particle diameter of the lithium silicate powder should more preferably be 0.5 to 10 μm, still more preferably be 0.5 to 5 μm.

The carbon dioxide gas absorbent according to this embodiment of the present invention can be suitably arranged in a carbon dioxide gas discharge passageway within a combustion apparatus for allowing the absorbent to absorb the carbon dioxide gas generated by the combustion of a hydrocarbon fuel. To be more specific, it is possible to decrease the amount of the carbon dioxide gas contained in the combustion waste gas released to the air atmosphere by disposing the lithium silicate powder in the passageway of the carbon dioxide gas generated by the combustion of a hydrocarbon-based fuel in a combustion apparatus such as an energy plant or an engine.

The lithium silicate powder can be used in the form of a molded body prepared by compressing the powder to such an extent as to permit the carbon dioxide gas to flow within the molded body. It is also possible to use the lithium silicate powder in the form of a porous body containing the lithium silicate powder. In this case, the porosity of the porous body should desirably be set at about 30% to 60%. If the porosity is lower than 30%, a carbon dioxide gas flowing passageway is not sufficient and it would be difficult to cause a reaction with carbon dioxide gas. On the other hand, if the porosity exceeds 60%, deterioration of mechanical strength would be caused.

Lithium silicate used in the present invention is a solid under temperatures of 1400° C. or less. The solid lithium silicate reacts with a carbon dioxide gas to form a solid silicon dioxide and lithium carbonate, thereby to absorb the carbon dioxide gas. The reaction is reversible. In other words, silicon dioxide reacts with lithium carbonate at about 700° C. to form lithium silicate and a carbon dioxide gas.

As described above, lithium silicate selectively absorbs a carbon dioxide gas at a desired site, and the absorbed carbon dioxide gas can be used again. Further, after release of the carbon dioxide gas, lithium silicate can be used again as a carbon dioxide gas absorbent.

As described above, the lithium silicate powder used as a carbon dioxide gas absorbent or used for preparing a molded body of lithium silicate has an average particle diameter of 0.1 to 50 μm. The average particle diameter can be measured by a laser diffractometry.

As already described, lithium is diffused from within the lithium silicate powder particle to the surface so as to carry out reaction with a carbon dioxide gas, thereby to absorb the carbon dioxide gas. The diffusion rate of lithium is low under low temperatures. Also, the reaction rate of lithium with a carbon dioxide gas is lowered under low temperatures. As a result, the carbon dioxide absorbing characteristics of lithium are markedly impaired under low temperatures. On the other hand, the diffusing distance of lithium to the surface of the lithium silicate powder particle is shortened if the average particle diameter of the lithium silicate powder is decreased, with the result that lithium easily reacts with a carbon dioxide gas. Naturally, the carbon dioxide gas absorbing characteristics are improved with decrease in the average particle diameter of the lithium silicate powder. However, if the particle diameter of the lithium silicate powder is excessively small, the powder tends to be agglomerated and, thus, the effective average particle diameter is not decreased. Also, interfaces are newly formed. Under the circumstances, the carbon dioxide absorbing characteristics are lowered. Such being the situation, it is defined in this embodiment of the present invention that the average particle diameter of the lithium silicate powder should be 0.1 to 50 μm. More preferably, the average particle diameter of the lithium silicate powder should be 0.5 to 10 μm, more preferably be 0.5 to 5 μm.

It is possible to add a carbonate of an alkali metal such as lithium, sodium, potassium to the lithium silicate powder. The addition of the carbonate makes it possible to promote the absorbing-releasing reactions of the resultant carbon dioxide gas absorbent.

The addition amount of the alkali carbonate should desirably be 5 to 30 mol % based on the amount of the lithium silicate powder. If the addition amount of the alkali carbonate is smaller than 5 mol %, it is difficult to promote sufficiently the carbon dioxide gas absorbing reaction. On the other hand, if the addition amount of the alkali carbonate exceeds 30 mol %, the promoting effect of the carbon dioxide gas absorbing reaction tends to be saturated. Further, the carbon dioxide gas absorbing amount per unit volume of the absorbent tends to be lowered. More preferably, the addition amount of the alkali carbonate should be 10 to 20 mol % based on the amount of the lithium silicate powder.

As already described, where a porous body consisting of a lithium silicate powder is used as a carbon dioxide gas absorbent, the carbonate of an alkali metal selected from lithium, sodium and potassium is held within the pores of the porous body.

The carbon dioxide gas absorbent in the form of a porous body is prepared, for example, as follows. In the first step, predetermined amounts of silicon dioxide and lithium carbonate are weighed and mixed within an agate mortar for 0.1 to 1 hour. The resultant mixed powder is put in an alumina crucible and is subjected to a heat treatment for 0.5 to 20 hours within a box-shaped electric heater under the air atmosphere, followed by pulverizing the heated powder in a planetary ball mixer until the average particle diameter of the powder is decreased to 0.1 to 50 μm, thereby to obtain a lithium silicate raw material powder. The average particle diameter can be controlled by controlling the pulverizing time. Then, a predetermined amount of the resultant lithium silicate powder is weighed, loaded in a mold and, then, subjected to a compression molding, so as to obtain a molded body having a porosity of about 40%, thereby to obtain a carbon dioxide gas absorbent in the form of a porous body.

It is possible to obtain a carbon dioxide gas absorbent capable of efficiently absorbing a carbon dioxide gas under a relatively low temperature of about 250° C. by pulverizing a lithium silicate powder to have an average particle diameter of 0.1 to 50 μm.

The carbon dioxide gas absorbent containing a lithium silicate powder having a predetermined average particle diameter can be arranged in a discharge passageway of the combustion gas of a combustion apparatus.

Figure 3:
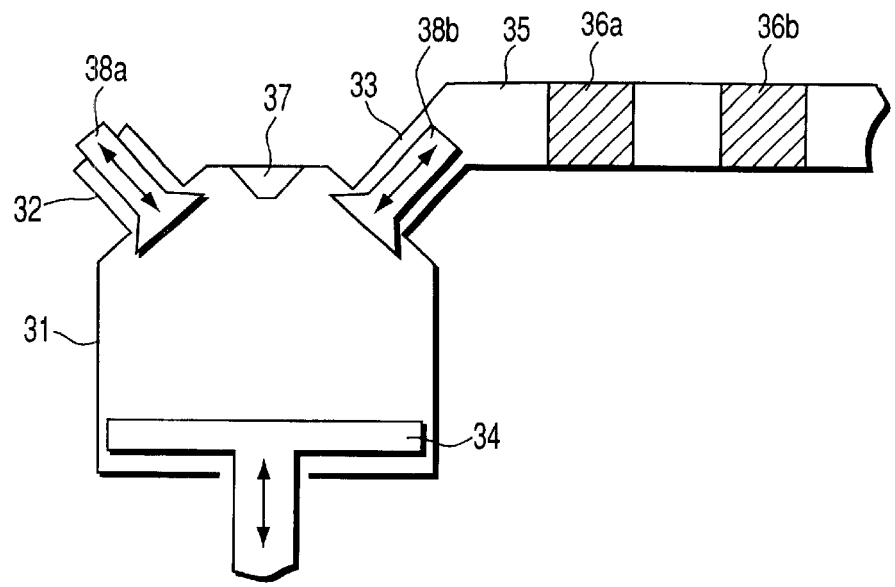
FIG. 3 schematically exemplifies the construction of a combustion apparatus loaded with a carbon dioxide gas absorbent of the present invention.

FIG. 3 schematically shows an engine provided with a carbon dioxide gas absorbent. As shown in the drawing, the engine comprises a fuel combustion chamber 31, which is equipped with a fuel supply port 32, combustion gas outlet port 33, an ignition means 37 for combusting a hydrocarbon-based fuel such as gasoline introduced into the combustion chamber 31 through the fuel supply port 32, and a piston 34 driven in accordance with the inner pressure of the combustion chamber 31. Valves 38a and 38b are arranged within the fuel supply port 32 and a combustion gas outlet port 33 for controlling the timings of supplying a fuel and discharging the combustion gas, respectively. The steps of fuel supply, combustion of the fuel and discharge of the combustion gas are repeated so as to change the inner pressure of the combustion chamber 31, thereby to drive the piston 34. Also, a combustion gas discharge passageway 35 is connected to the combustion gas outlet port 33 such that the combustion gas is discharged to the outside through the combustion gas discharge passageway 35.

As shown in FIG. 3, a carbon dioxide gas absorbent 36a containing a lithium silicate powder having a predetermined average particle diameter is arranged within the combustion gas discharge passageway 35. The carbon dioxide gas contained in the combustion gas is partly absorbed by the carbon dioxide gas absorbent 36a so as to lower the carbon dioxide gas concentration within the combustion gas.

Where the combustion gas discharged from the combustion chamber 31 is a high temperature, it is possible to arrange a carbon dioxide gas absorbent 36b capable of absorbing a carbon dioxide gas at a higher temperature on the outlet side of the discharge passageway 35 as shown in the drawing. It is possible to use, for example, lithium zirconate. The carbon dioxide gas concentration in the combustion gas discharged from the combustion chamber can be further lowered by arranging different carbon dioxide gas absorbents 36a and 36b at different positions where these absorbents are allowed to perform their functions at desired temperatures.

A third embodiment of the present invention will now be described. Specifically, the third embodiment is directed to a carbon dioxide gas absorbent containing lithium silicate and at least one kind of an alkali carbonate selected from the group consisting of sodium carbonate and potassium carbonate.

As already described, the present inventors have found that lithium silicate that is lightweight, compared with the conventional absorbent of lithium zirconate, is suitable for use as a carbon dioxide gas absorbent. It has also been found that the capability of absorbing a carbon dioxide gas can be further improved by adding an alkali carbonate to lithium silicate, making it possible to achieve an efficient absorption of a carbon dioxide gas of a low concentration.

Lithium silicate is generally represented by a general formula $Li_xSi_yO_z$, where $x+4y-2z=0$, and includes, for example, $Li_4SiO_4$ and $Li_2SiO_3$.

As already pointed out, lithium silicate reacts with a carbon dioxide gas under temperatures of generally 200 to 700° C. to form lithium carbonate as shown by the reaction formula (1) given below:

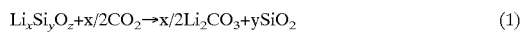

$$Li_xSi_yO_z + x/2 CO_2 \rightarrow x/2 Li_2CO_3 + y SiO_2 \qquad (1)$$

Also, the reaction reverse to the reaction given by the reaction formula (1) also takes place, if the reaction system is heated to exceed 700° C., as indicated in reaction formula (2) given below:

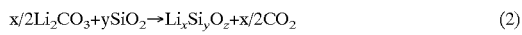

$$x/2 Li_2CO_3 + y SiO_2 \rightarrow Li_xSi_yO_z + x/2 CO_2 \qquad (2)$$

The reaction temperature is somewhat changed depending on the composition of lithium silicate or on the partial pressure of the carbon dioxide gas.

Lithium silicate is also advantageous over lithium zirconate in the carbon dioxide gas absorption amount per unit weight. Theoretically, 1 mol (153 g) of $Li_2ZrO_3$ is required for absorbing 1 mol of a carbon dioxide gas. On the other hand, 1 mol of a carbon dioxide gas can be absorbed by 0.5 mol (60 g) of $Li_4SiO_4$. Also, the same amount of the carbon dioxide gas can be absorbed by 1 mol (90 g) of $Li_2SiO_3$. As pointed out above, the same molar amount of a carbon dioxide gas can be absorbed by a smaller amount of lithium silicate, i.e., in an amount half or one-third of the weight of lithium zirconate.

Further, the carbon dioxide absorption amount per mol of lithium silicate can be increased by increasing the value x in the general formula noted above. Therefore, it is possible to increase the carbon dioxide gas absorption efficiency of the carbon dioxide gas absorbent. To be more specific, it is desirable for the value of x in the general formula to be at least 4, i.e., the carbon dioxide absorbent should desirably be $Li_4SiO_4$. As shown in the general formula (4) given below, 1 mol of $Li_4SiO_4$ permits absorbing 2 mols of a carbon dioxide gas, making it possible to prominently improve the absorption efficiency:

$$Li_4SiO_4 + 2CO_2 \rightarrow 2Li_2CO_3 + SiO_2 \qquad (3)$$

As already pointed out, lithium silicate is lightweight and, thus, is adapted for use in a combustion apparatus that is moved. To be more specific, lithium silicate is suitable for use as a carbon dioxide gas absorbent for absorbing a carbon dioxide gas contained in an exhaust gas discharged from an engine (combustion apparatus) of a motor car.

The present inventors have found that the carbon dioxide gas absorption characteristics can be markedly promoted by adding an alkali carbonate to lithium silicate, making it possible to obtain a carbon dioxide gas absorbent capable of absorbing efficiently a carbon dioxide gas even under a low temperature atmosphere.

The alkali carbonate used in the present invention includes, for example, potassium carbonate and sodium carbonate.

Where an alkali carbonate is added to lithium silicate, a eutetic salt is formed by lithium carbonate formed by the carbonate absorption and the alkali carbonate so as to lower the melting point of the material. As a result, lithium silicate, which is liquefied at about 730° C. when used singly, is liquefied at about 500° C. when an alkali carbonate is added to lithium silicate. It is considered reasonable to understand that the lowered liquefying temperature makes it possible to carry out the reaction between lithium and a carbon dioxide gas promptly, leading to improvements in the carbon dioxide gas absorption characteristics and in the absorption capability under low temperatures.

The addition amount of the alkali carbonate to lithium silicate should desirably be 5 to 30 mol %. Where the alkali carbonate addition amount is smaller than 5 mol %, it is difficult to liquefy sufficiently the carbon dioxide gas absorbent, resulting in failure to obtain a sufficient effect produced by the alkali carbonate addition. On the other hand, if the alkali carbonate addition amount exceeds 30 mol %, the effect of promoting the carbon dioxide gas absorbing reaction performed by lithium silicate is saturated. In addition, the lithium silicate content of the entire carbon dioxide gas absorbent is lowered. As a result, the carbon dioxide gas absorption amount per unit volume of the carbon dioxide gas absorbent tends to be lowered. The carbon dioxide gas absorbing rate also tends to be lowered.

It is desirable for the lithium silicate powder or the alkali carbonate powder to have an average particle diameter of 0.1 to 50 μm. Where the average particle diameter of these powders is smaller than 0.1 μm, the powders tend to be agglomerated. On the other hand, if the average particle diameter of the lithium silicate powder exceeds 50 μm, the contact area with the alkali carbonate is decreased so as to lower the carbon dioxide gas absorption rate. Also, where the average particle diameter of the alkali carbonate powder exceeds 50 μm, it takes a long time to form a eutectic salt, leading to a low carbon dioxide gas absorbing rate.

Further, in order to facilitate the eutectic salt formation, it is desirable for the alkali carbonate to be dispersed uniformly in lithium silicate.

The shape of the carbon dioxide gas absorbent containing lithium silicate and an alkali carbonate is not particularly limited. For example, it is possible to use a mixed powder containing a lithium silicate powder and an alkali carbonate powder. Alternatively, the powder mixture can be subjected to a compression molding to obtain a molded body. It should be noted, however, that, where the carbon dioxide gas absorbent is used in the form of a molded body, it is desirable for the carbon dioxide gas to be capable of flowing within the molded body so as not to decrease the contact area between the molded body and the carbon dioxide gas. For example, it is desirable for the molded body to be porous.

The carbon dioxide gas absorbent of this embodiment can be prepared as follows. In the first step, a lithium silicate powder is prepared, followed by adding an alkali carbonate powder to the lithium silicate powder.

Incidentally, lithium silicate can be obtained by reaction under heat between a lithium carbonate powder and a silicon dioxide powder. It should be noted that, if an alkali carbonate is added in the synthesizing step such that a mixed powder consisting of a lithium carbonate powder, an alkali carbonate powder and a silicon dioxide powder is heated, the melting point of the mixed powder is lowered, with the result that the composition ratio of lithium silicate to the alkali carbonate tends to be deviated from a desired composition rate. In this case, the net amount of lithium silicate participating in the carbon dioxide gas absorption reaction is considered to be decreased. If the amount of lithium silicate is decreased, the carbon dioxide gas absorbing capability is lowered.

In order to avoid these inconveniences, it is desirable to add an alkali carbonate after preparation of lithium silicate, as described above.

To be more specific, the carbon dioxide gas absorbent according to the third embodiment of the present invention can be prepared as follows. In the first step, a mixture of silicon dioxide and lithium carbonate is heated to about 700 to 1,200° C. so as to synthesize lithium silicate as denoted by the reaction formula (2) given previously. For example, in the case of synthesizing $Li_4SiO_4$, it is desirable to add an excessive amount of lithium carbonate, though the theoretical molar ratio of lithium carbonate to silicon dioxide ($Li_2CO_3:SiO_2$) is 2:1. Where lithium carbonate is added in an excessive large amount, it is possible to prevent unreacted silicon dioxide from remaining in the system because of nonuniform distribution of lithium carbonate. To be more specific, it is desirable to set the molar mixing ratio of lithium carbonate to silicon dioxide ($Li_2CO_3:SiO_2$) at 2 to 2.4:1.

The mixed powder consisting of lithium carbonate and silicon dioxide mixed at the mixing ratio noted above is mixed in, for example, an agate mortar for 0.1 to 1 hour to prepare a mixed powder having an average particle diameter of 0.1 to 10 μm. The resultant mixed powder is put in a heating vessel such as an alumina crucible and is subjected to a heat treatment within a box-shaped electric furnace for 0.5 to 40 hours under the air atmosphere, thereby to obtain a lithium silicate powder.

The lithium silicate powder thus obtained is pulverized by using again an agate mortar such that the average particle diameter of the lithium silicate powder is 0.1 to 50 μm. Incidentally, the pulverization of the lithium silicate powder synthesized by the heat treatment can be performed in the step of mixing the lithium silicate powder with an alkali carbonate described herein later. The average particle diameter of the lithium silicate powder can be adjusted to fall within a desired range in this case, too.

In the next step, the lithium silicate powder and a powder of an alkali carbonate, e.g., potassium carbonate, are weighed such that the potassium carbonate powder is contained in an amount of 5 to 30 mol % based on the lithium silicate powder, followed by pulverizing the mixture in, for example, an agate mortar for 0.1 to 10 hours, thereby to obtain a carbon dioxide gas absorbent.

In order to avoid the inconveniences described above, the alkali carbonate powder should be added after preparation of the lithium silicate powder.

The carbon dioxide gas absorbent thus prepared can be arranged in a discharge passageway of a combustion apparatus having a combustion chamber and equipped with a fuel supply passageway and a waste gas discharge passageway. By using the carbon dioxide gas absorbent of this embodiment in the combustion apparatus of the particular construction, the carbon dioxide gas discharged from the combustion chamber can be absorbed by the absorbent so as to lower the carbon dioxide gas content of the exhaust gas. Particularly, since the carbon dioxide gas absorbent according to the third embodiment of the present invention contains an alkali carbonate, a carbon dioxide gas of a low concentration can also be absorbed efficiently, not to mention a carbon dioxide gas of a high concentration.

In general, in a combustion apparatus of, for example, a motor car, the carbon dioxide gas content of the exhaust gas differs depending on the state of use of the motor car. Therefore, it is highly effective to use the carbon dioxide gas absorbent of the third embodiment of the present invention. In addition, since the carbon dioxide gas absorbent of the present invention is lightweight, the absorbent of the present invention is adapted for use for recovering a carbon dioxide gas discharged from a combustion apparatus providing a driving source of a moving apparatus such as a motor car.

It is possible to use the carbon dioxide gas absorbent described above in combination with another component, e.g., another carbon dioxide gas absorbent such as lithium zirconate.

Figure 4:
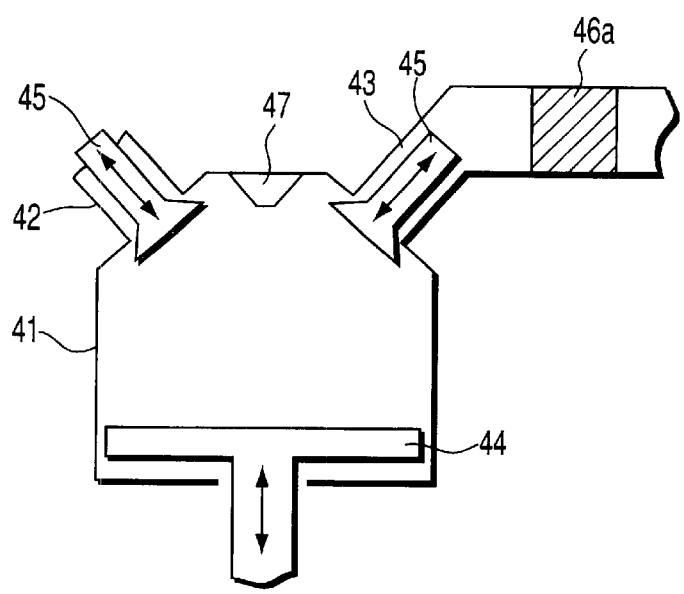
FIG. 4 schematically shows another example of the construction of a combustion apparatus loaded with a carbon dioxide gas absorbent of the present invention.

FIG. 4 schematically shows as an example a combustion apparatus having a carbon dioxide gas absorbent of the present invention mounted therein.

As shown in the drawing, the combustion apparatus includes a combustion chamber 41, which is equipped with a fuel supply passageway 42 for supplying a hydrocarbon-based fuel into the combustion chamber 41, a discharge passageway 43 for discharging the combustion gas generated within the combustion chamber 41, an igniting means 47 for combusting the hydrocarbon-based fuel such as gasoline introduced through the fuel supply passageway 42 into the combustion chamber 41, and a piston 44 driven in accordance with change in the inner pressure of the combustion chamber 41. Valves 45 are arranged within the fuel supply passageway 42 and the discharge passageway 43 for controlling the timings of supplying the fuel into the combustion chamber 41 and for controlling the timing of discharging the combustion gas from within the combustion chamber 41. By repeating the steps of introducing the fuel into the combustion chamber 41, combusting the introduced fuel within the combustion chamber 41 and discharging the combustion gas from within the combustion chamber 41, the inner pressure of the combustion chamber 41 is changed so as to drive the piston 44 in a direction denoted by an arrow.

In the apparatus shown in FIG. 4, a carbon dioxide gas absorbent 46 prepared by housing a carbon dioxide gas absorbent containing the alkali carbonate in a permeable container is arranged in the combustion gas discharge passageway 43. The carbon dioxide gas contained in the combustion gas is absorbed and trapped by the carbon dioxide gas absorbent 46 so as to lower the carbon dioxide gas concentration in the combustion gas discharged from the combustion chamber 41.

Specific examples of the present invention will now be described in detail.

Embodiment I

This embodiment is directed to a lightweight carbon dioxide gas absorbent that performs its function under high temperature region exceeding about 500° C. while maintaining a high performance.

EXAMPLE I-1

A lithium carbonate powder having an average particle diameter of 1 mm and a silicon dioxide powder having an average particle diameter of 0.8 mm were weighed in a molar ratio of 2:1 and subjected to a dry mixing for 10 minutes within an agate mortar.

The resultant powder was subjected to a heat treatment for 8 hours at 1,000° C. within a box-shaped electric furnace under the air atmosphere so as to obtain a lithium silicate powder. Then, the resultant lithium silicate powder was loaded in a mold having a diameter of 12 mm so as to apply a compression molding, thereby to obtain a carbon dioxide gas absorbent in the form of a molded body having a porosity of 40%.

EXAMPLE I-2

A carbon dioxide gas absorbent in the form of a molded body was prepared as in Example I-1, except that a lithium carbonate powder and the silicon dioxide powder were mixed at a molar ratio of 4:1.

EXAMPLE I-3

A carbon dioxide gas absorbent in the form of a molded body was prepared as in Example I-1, except that a lithium carbonate powder and the silicon dioxide powder were mixed at a molar ratio of 3:2.

EXAMPLE I-4

A carbon dioxide gas absorbent in the form of a molded body was prepared as in Example I-1, except that a lithium carbonate powder and the silicon dioxide powder were mixed at a molar ratio of 1:1.

COMPARATIVE EXAMPLE I-1

A lithium carbonate powder having an average particle diameter of 1 mm and a zirconium oxide powder having an average particle diameter of 0.3 mm were weighed in a molar ratio of 1:1 and subjected to a dry mixing for 10 minutes within an agate mortar.

The resultant powder was subjected to a heat treatment for 10 hours at 800° C. within a box-shaped electric furnace under the air atmosphere so as to obtain a lithium zirconate powder. Then, the resultant zirconium silicate powder was loaded in a mold having a diameter of 12 mm so as to apply a compression molding, thereby to obtain a carbon dioxide gas absorbent in the form of a molded body having a porosity of 40%.

The carbon dioxide gas absorbent prepared in each of Examples I-1 to I-4 and Comparative Example I-1 was set in a box-shaped electric furnace. Under this condition, a mixed gas consisting of 20% by volume of a carbon dioxide gas and 80% by volume of a nitrogen gas was kept circulated within the furnace for 1 hour while maintaining the gas temperature at 600° C. The absorbed amount of the carbon dioxide gas was measured by examining the weight increase of the absorbent after the experiment, compared with the weight of the absorbent before the experiment. Table 1 shows the results together with the formula weight.

Incidentally, a similar experiment was conducted by supplying a nitrogen gas alone into the electric furnace in which each of the absorbents noted above was loaded. In this case, an increase in the weight of the absorbent was not recognized at all.

Also, the amount of a carbon dioxide gas released from each of the absorbents prepared in each of Examples I-1 to I-4 was measured as follows. Specifically, a mixed gas consisting of 20% by volume of a carbon dioxide gas and 80% by volume of a nitrogen gas was circulated within the electric furnace in which each of the absorbents was loaded while maintaining the temperature at 500° C. for 5 hours. Then, the temperature was once lowered to room temperature so as to measure the weight of each of the absorbents. Further, the temperature was held at 800° C. for 1 hour while circulating the mixed gas of the same composition so as to measure the reduction in the weight of each of the carbon dioxide gas absorbents, thereby to measure the amount of the carbon dioxide gas released from the absorbent.

Concerning the absorbent of Comparative Example 1, the temperature for the carbon dioxide gas absorption was set at 500° C., and the absorbed gas was released from the absorbent at 600° C. Table 1 also shows the results for Comparative Example 1.

Further, the weight of each of the carbon dioxide gas absorbents prepared in Examples I-1 to I-4 and Comparative Example I-1 required for absorbing the same volume of $CO_2$ was obtained as follows. In the first step, the carbon dioxide gas absorbent was housed in a columnar vessel having an outer diameter of 50 mm and a height of 200 mm and heated at 800° C. for 1 hour under a nitrogen gas atmosphere. Then, the vessel was evacuated by a rotary pump to a vacuum of 0.1 Torr, followed by introducing a carbon dioxide gas until the inner pressure of the vessel was increased to the atmospheric pressure. Under this condition, the temperature within the vessel was maintained at 500° C. for 3 hours. Since the vessel was kept hermetic, the inner pressure of the vessel was lowered by the carbon dioxide gas absorption performed by the carbon dioxide gas absorbent.

The degree of vacuum arrived at within the vessel differs depending on the amount of the carbon dioxide gas absorbent loaded in the vessel. The similar experiment was repeatedly performed until the inner pressure of the vessel was lowered to reach 0.1 Torr by increasing the amount of the absorbent loaded in the vessel. Table 1 also shows the weight of the carbon dioxide gas absorbent required for lowering the inner pressure of the vessel to 0.1 Torr.

TABLE 1

|  | Li$_2$CO$_3$:SiO$_2$ molar ratio | Absorbent | Formula weight | Carbon dioxide amount absorbed at 600° C. (wt %) | Carbon dioxide amount released at 800° C. (wt %) | Weight required for absorbing 0.4 liter of carbon dioxide gas (g) |
|---|---|---|---|---|---|---|
| Example I-1 | 2:1 | Li$_4$SiO$_4$ | 119.8 | 66 | 67 | 1.3 |
| Example I-2 | 4:1 | Li$_8$SiO$_6$ | 179.6 | 88 | 85 | 1.0 |
| Example I-3 | 3:2 | Li$_6$Si$_2$O$_7$ | 209.8 | 56 | 56 | 1.5 |
| Example I-4 | 1:1 | Li$_2$SiO$_3$ | 90.0 | 44 | 44 | 2.0 |
| Comparative Example I-1 | | Li$_2$ZrO$_3$ | 153.1 | 26 | 25 | 3.4 |

Table 1 clearly shows that the amount of the carbon dioxide gas absorption for the carbon dioxide gas absorbent of the present invention containing lithium silicate (Examples I-1 to I-4) is larger than that for the absorbent of Comparative Example I-1, supporting that the absorbent of the present invention exhibits excellent carbon dioxide gas absorption characteristics.

It should also be noted that the absorbed amount and the released amount of the carbon dioxide gas were substantially equal to each other in the carbon dioxide gas absorbent of the present invention containing lithium silicate (Examples I-1 to I-4), supporting that the absorbent of the present invention is capable of absorbing-releasing a carbon dioxide gas. Further, the weight of the carbon dioxide gas absorbent of the present invention required for absorbing the same amount of a carbon dioxide gas is smaller than that of the absorbent for the Comparative Example, supporting that the absorbent of the present invention used is lightweight.

EXAMPLE I-5

120 kg of the lithium silicate prepared in Example I-1 was loaded in the inner tube of a nickel-based absorption tower of a double wall structure having an inner diameter of 300 mm, an outer diameter of 400 mm and a length of 2500 mm. The absorption tower thus prepared was incorporated as the first absorption tower in the carbon dioxide gas separating device shown in FIG. 1. In this experiment, a mixed gas containing a hydrogen gas, a carbon dioxide gas and steam, which were mixed at a mixing ratio by volume of 1/3:1/3:1/3, was used at 600° C. as a gas containing a carbon dioxide gas. The mixed gas was circulated for 3 hours through the inner tube of the first absorption tower at a flow rate of $1.0 \times 10^3$ mol/h (converted for the standard condition).

During the carbon dioxide gas absorbing operation, the gas temperature was measured at the outlet port of the absorption tower. Also, the increase in the weight of the lithium silicate was measured so as to obtain a reaction rate as the absorbent relative to the theoretical value based on the reaction formula (1). Further, the carbon dioxide gas collecting rate was measured. The experimental data were found to be 94.3% for the reaction rate and 85.8% for the collecting rate, supporting that the lithium silicate absorbent exhibits an excellent carbon dioxide gas absorption capability.

EXAMPLE I-6

A nitrogen gas was circulated at 800° C. through the inner tube of the absorption tower in which absorption of a carbon dioxide gas was performed by the method employed in Example I-5 so as to recover the carbon dioxide gas. The circulating rate of the nitrogen gas was set at $5.76 \times 10^3$ L (liters)/h. As a result, the carbon dioxide gas concentration at the outlet port of the absorption tower was found to be 78.2%, supporting that the carbon dioxide gas was released promptly.

The experimental data obtained in Examples I-5 and I-6 clearly support that a carbon dioxide gas separating apparatus producing various merits can be obtained by using the carbon dioxide gas absorbent of the present invention containing lithium silicate. Specifically, the apparatus is capable of processing a relatively high temperature gas containing a carbon dioxide gas. In addition, it is possible to save the energy consumed for separating the carbon dioxide gas. Further, the apparatus is capable of absorbing and concentrating the carbon dioxide gas contained in the exhaust gas discharged from, for example, an energy plant at a high efficiency and at a low cost.

EXAMPLE I-7

A carbon dioxide gas absorbent consisting of 20 mol % of lithium zirconate and 80 mol % of lithium silicate was loaded in an annular furnace. Then, a heating cycle consisting of the heating at 500° C. for 3 hours and the heating at 800° C. for 1 hour was repeated 1,000 times while circulating a gas containing 20% of $CO_2$ through the annular furnace at a low rate of 300 mL/min so as to measure the change in the weight of the carbon dioxide gas absorbent with a thermobalance. It has been found that the carbon dioxide gas absorbent after 1,000 heating cycles exhibits the carbon dioxide absorption in an amount about 90% of the initial absorption amount.

Incidentally, when it comes to a carbon dioxide gas absorbent consisting of lithium silicate alone, the absorbent after 500 heating cycles was found to exhibit the carbon dioxide absorption in an amount about 70% of the initial absorption amount.

As described above, the carbon dioxide gas absorbent according to Embodiment I of the present invention is lightweight and performs a satisfactory function under a high temperature region exceeding about 500° C.

Embodiment II

This embodiment is directed to a carbon dioxide gas absorbent capable of exhibiting a high carbon dioxide gas absorbing function under a low temperature region of about 250° C.

EXAMPLE II-1

A lithium carbonate powder having an average particle diameter of 1 μm and a silicon dioxide powder having an average particle diameter of 0.8 μm were weight at a molar ratio of 2:1 and subjected to a dry mixing for 10 minutes in an agate mortar.

The resultant mixed powder was put in a box-shaped electric furnace and subjected to a heat treatment for 8 hours at 1,000° C. under the air atmosphere so as to obtain a lithium silicate ($Li_4SiO_4$) powder. Then, the lithium silicate powder was pulverized for 16 hours in a planetary ball mill so as to obtain a lithium silicate powder having an average particle diameter of 3 $\mu$m.

The lithium silicate powder thus obtained was loaded in a mold having a diameter of 12 mm and subjected to a compression molding so as to obtain a carbon dioxide gas absorbent in the form of a molded body having a porosity of 40%.

EXAMPLE II-2

A carbon dioxide gas absorbent in the form of a molded body was prepared as in Example II-1, except that the molar mixing ratio of the lithium carbonate powder to the silicon dioxide powder was set at 4:1 so as to obtain lithium silicate of $Li_8SiO_6$.

EXAMPLE II-3

A carbon dioxide gas absorbent in the form of a molded body was prepared as in Example II-1, except that the molar mixing ratio of the lithium carbonate powder to the silicon dioxide powder was set at 3:2 so as to obtain lithium silicate of $Li_6Si_2O_7$.

EXAMPLE II-4

A carbon dioxide gas absorbent in the form of a molded body was prepared as in Example II-1, except that the molar mixing ratio of the lithium carbonate powder to the silicon dioxide powder was set at 1:1 so as to obtain lithium silicate of $Li_2SiO_3$.

EXAMPLE II-5

A carbon dioxide gas absorbent in the form of a molded body was prepared as in Example II-1, except that the pulverizing time using a planetary ball mill was set at 64 hours to obtain a lithium silicate powder having an average particle diameter of 0.1 $\mu$m, and the lithium silicate powder thus obtained was used for the preparation of the carbon dioxide gas absorbent.

EXAMPLE II-6

A carbon dioxide gas absorbent in the form of a molded body was prepared as in Example II-1, except that the pulverizing time using a planetary ball mill was set at 32 hours to obtain a lithium silicate powder having an average particle diameter of 1 $\mu$m, and the lithium silicate powder thus obtained was used for the preparation of the carbon dioxide gas absorbent.

EXAMPLE II-7

A carbon dioxide gas absorbent in the form of a molded body was prepared as in Example II-1, except that the pulverizing time using a planetary ball mill was set at 8 hours to obtain a lithium silicate powder having an average particle diameter of 5 $\mu$m, and the lithium silicate powder thus obtained was used for the preparation of the carbon dioxide gas absorbent.

EXAMPLE II-8

A carbon dioxide gas absorbent in the form of a molded body was prepared as in Example II-1, except that the pulverizing time using a planetary ball mill was set at 2 hours to obtain a lithium silicate powder having an average particle diameter of 9 $\mu$m, and the lithium silicate powder thus obtained was used for the preparation of the carbon dioxide gas absorbent.

EXAMPLE II-9

A carbon dioxide gas absorbent in the form of a molded body was prepared as in Example II-1, except that the pulverizing time using a planetary ball mill was set at 96 hours to obtain a lithium silicate powder having an average particle diameter of 0.05 $\mu$m, and the lithium silicate powder thus obtained was used for the preparation of the carbon dioxide gas absorbent.

EXAMPLE II-10

A carbon dioxide gas absorbent in the form of a molded body was prepared as in Example II-1, except that the pulverizing treatment using a planetary ball mill was not employed and the lithium silicate powder having an average particle diameter of 30 $\mu$m was used as it was.

COMPARATIVE EXAMPLE II-1

A lithium carbonate powder having an average particle diameter of 1 $\mu$m and an iron oxide powder having an average particle diameter of 1 $\mu$m were weighed in a molar ratio of 1:1 and subjected to a dry mixing for 10 minutes within an agate mortar.

The resultant powder was subjected to a heat treatment as in Example II-1 so as to obtain a $LiFeO_2$ powder. Then, the resultant powder was pulverized as in Example II-1 to obtain a fine powder having an average particle diameter of 3 $\mu$m. Then, a carbon dioxide gas absorbent in the form of a molded body having a porosity of 40% was obtained as in

EXAMPLE II-1

The carbon dioxide gas absorbent prepared in each of Examples II-1 to II-10 and Comparative Example II-1 was set in a box-shaped electric furnace. Under this condition, a mixed gas consisting of 20% by volume of a carbon dioxide gas and 80% by volume of a nitrogen gas was kept circulated within the furnace for 6 hours while maintaining the gas temperature at 250° C. and 450° C., respectively. The absorbed amount of the carbon dioxide gas was measured by examining the weight increase of the absorbent after the experiment, compared with the weight of the absorbent before the experiment. Table 2 shows the results.

Incidentally, a similar experiment was conducted by supplying a nitrogen gas alone into the electric furnace in which each of the absorbents noted above was loaded. In this case, an increase in the weight of the absorbent was not recognized at all.

Also, the amount of a carbon dioxide gas released from each of the absorbents prepared in each of Examples II-1 to II-8 was measured as follows. Specifically, a mixed gas consisting of 20% by volume of a carbon dioxide gas and 80% by volume of a nitrogen gas was circulated within the electric furnace in which each of the absorbents was loaded while maintaining the temperature at 250° C. for 6 hours. Then, the temperature was once lowered to room temperature so as to measure the weight of each of the absorbents. Further, the temperature was held at 800° C. for 1 hour while circulating the mixed gas of the same composition so as to measure the reduction in the weight of each of the carbon dioxide gas absorbents, thereby to measure the amount of the carbon dioxide gas released from the absorbent. Table 2 also shows the results.

TABLE 2

|  | Average particle diameter μm | Carbon dioxide gas absorption amount at 250° C. (wt %) | Carbon dioxide gas absorption amount at 450° C. (wt %) | Carbon dioxide gas release amount at 800° C. (wt %) |
|---|---|---|---|---|
| Example II-1 | 3 | 13 | 25 | 13 |
| Example II-2 | 3 | 17 | 33 | 16 |
| Example II-3 | 3 | 11 | 24 | 11 |
| Example II-4 | 3 | 9 | 20 | 9 |
| Example II-5 | 0.1 | 20 | 35 | 19 |
| Example II-6 | 1 | 18 | 30 | 17 |
| Example II-7 | 5 | 11 | 23 | 11 |
| Example II-8 | 9 | 9 | 20 | 9 |
| Example II-9 | 0.05 | 8 | 14 | — |
| Example II-10 | 30 | 1 | 5 | — |
| comparative Example II-1 | 3 | 0.1 | 0.8 | — |

As apparent from Table 2, the carbon dioxide gas absorption amount for each of Examples II-1 to II-8 was markedly larger than that for Example II-9 or Example II-10, supporting that the carbon dioxide gas absorbent for each of Examples II-1 to II-8 exhibits excellent carbon dioxide absorption characteristics. In other words, the experimental data support that a lithium silicate powder having an average particle diameter of 0.1 to 50 μm exhibits a high carbon dioxide absorption capability, compared with the absorbent having an average particle diameter failing to fall within the range noted above. Further, Examples II-1 and II-5 support that the average particle diameter of the lithium silicate powder should preferably be 0.5 to 10 μm, more preferably be 0.5 to 5 μm.

The amount of the carbon dioxide gas released from the carbon dioxide gas absorbent for each of Examples II-1 to II-8 was found to be substantially equal to the amount of the carbon dioxide gas absorbed by each of these absorbents, supporting that each of these absorbents is capable of absorbing-releasing a carbon dioxide gas.

It has also been found that the effect produced by the definition of the average particle diameter of the carbon dioxide gas absorbent is prominent under the temperature region not higher than 250° C.

As described above, the carbon dioxide gas absorbent according to the second embodiment of the present invention exhibits a high carbon dioxide gas absorbing power even under a relatively low temperature region not higher than 250° C. Also, the carbon dioxide gas concentration in a combustion gas can be lowered by arranging a carbon dioxide gas absorbent of the present invention in the discharge passageway of the combustion gas generated in a combustion apparatus, making it possible to discharge the exhaust gas low in the carbon dioxide gas content to the outside.

Embodiment III

This embodiment is directed to a carbon dioxide gas absorbent that is lightweight and is capable of efficiently recovering a carbon dioxide gas of a low concentration under a high temperature region.

EXAMPLE III-1

A lithium carbonate powder having an average particle diameter of 1 μm and a silicon dioxide powder having an average particle diameter of 0.8 μm were weighed at a molar ratio of 2:1 and subjected to a dry mixing for 10 minutes in an agate mortar.

The resultant mixed powder was put in a box-shaped electric furnace and subjected to a heat treatment for 8 hours at 1,000° C. under the air atmosphere so as to obtain a lithium silicate ($Li_4SiO_4$) powder. Then, the lithium silicate powder thus obtained and a potassium carbonate powder as an alkali carbonate powder having an average particle diameter of 0.5 μm were weighed at a molar ratio of 1:0.05 and subjected to a dry mixing for 10 minutes in an agate mortar so as to obtain a lithium silicate-based carbon dioxide absorbent consisting of the mixed powder having an average particle diameter of 3 μm.

EXAMPLE III-2

A carbon dioxide gas absorbent was prepared as in Example III-1, except that the molar mixing ratio of the lithium carbonate powder to the potassium carbonate powder was set at 1:0.1.

EXAMPLE III-3

A carbon dioxide gas absorbent was prepared as in Example III-1, except that the molar mixing ratio of the lithium carbonate powder to the potassium carbonate powder was set at 1:0.2.

EXAMPLE III-4

A carbon dioxide gas absorbent was prepared as in Example III-1, except that the molar mixing ratio of the lithium carbonate powder to the potassium carbonate powder was set at 1:0.3.

EXAMPLE III-5

A carbon dioxide gas absorbent was prepared as in Example III-1, except that the molar mixing ratio of the lithium carbonate powder to the potassium carbonate powder was set at 1:0.4.

EXAMPLE III-6

A carbon dioxide gas absorbent was prepared as in Example III-1, except that a sodium carbonate powder was used in place of the potassium carbonate used as an alkali carbonate.

EXAMPLE III-7

A lithium carbonate powder having an average particle diameter of 1 μm, a silicon dioxide powder having an average particle diameter of 0.8 μm, and a potassium carbonate powder having an average particle diameter of 0.5 µm were weighed at a molar ratio of 2:1:0.2 and subjected to a dry mixing for 10 minutes in an agate mortar.

The resultant mixed powder was put in a box-shaped electric furnace and subjected to a heat treatment for 8 hours at 1,000° C. under the air atmosphere so as to obtain a lithium silicate ($Li_4SiO_4$) powder having potassium carbonate added thereto.

EXAMPLE III-8

A lithium carbonate powder having an average particle diameter of 1 µm and a silicon dioxide powder having an average particle diameter of 0.8 µm were weighed at a molar ratio of 2:1 and subjected to a dry mixing for 10 minutes in an agate mortar.

The resultant mixed powder was put in a box-shaped electric furnace and subjected to a heat treatment for 8 hours at 1,000° C. under the air atmosphere so as to obtain a lithium silicate ($Li_4SiO_4$) powder.

COMPARATIVE EXAMPLE III-1

A lithium carbonate powder having an average particle diameter of 1 µm and a zirconium dioxide powder having an average particle diameter of 0.8 µm were weighed at a molar ratio of 1:1 and subjected to a dry mixing for 10 minutes in an agate mortar.

The resultant mixed powder was put in a box-shaped electric furnace and subjected to a heat treatment for 8 hours at 1,000° C. under the air atmosphere so as to obtain a carbon dioxide gas absorbent consisting of a lithium zirconate ($Li_2ZrO_3$) powder.

COMPARATIVE EXAMPLE III-2

A lithium zirconate powder obtained by a heat treatment as in Comparative Example III-1 and a potassium carbonate powder having an average particle diameter of 0.5 µm were weighed at a molar ratio of 1:0.2 and subjected to a dry mixing for 10 minutes in an agate mortar so as to obtain a lithium zirconate-based carbon dioxide gas absorbent consisting of the mixed powder having an average particle diameter of 3 µm.

Each of the carbon dioxide gas absorbents prepared in Examples III-1 to III-8 and Comparative Examples III-1 and III-2 was maintained at 500° C. for 3 hours while circulating a mixed gas consisting of 80% by volume of a nitrogen and 20% by volume of a carbon dioxide gas through the carbon dioxide gas absorbent at a flow rate of 300 mL/min. The increase in the weight of the absorbent after the test was obtained by a thermogravimetric analysis, and the rate of increase in the weight of the absorbent, i.e., the value obtained by dividing the weight increase by the weight before the measurement and denoted by percentage (%), was measured based on the weight increase obtained by the thermogravimetric analysis. Table 3 shows the results:

TABLE 3

| | Kind of alkali carbonate | Lithium silicate: alkali carbonate | Weight increase rate by thermogravimetric analysis |
|---|---|---|---|
| Example III-1 | $K_2CO_3$ | 1:0.05 | 30 |
| Example III-2 | $K_2CO_3$ | 1:0.1 | 31 |
| Example III-3 | $K_2CO_3$ | 1:0.2 | 33 |
| Example III-4 | $K_2CO_3$ | 1:0.3 | 32 |
| Example III-5 | $K_2CO_3$ | 1:0.4 | 31 |
| Example III-6 | $Na_2CO_3$ | 1:0.2 | 25 |
| Example III-7 | $K_2CO_3$ | 1:0.2 | 18 |
| Example III-8 | none | 1:0 | 3 |
| Comparative Example III-1 | none | 1:0(note) | 1 |
| Comparative Example III-1 | $K_2CO_3$ | 1:0.2(note) | 22 |

Note:
Ratio of alkali carbonate to lithium zirconate

As apparent from Table 3, the weight increase of the carbon dioxide gas absorbent containing an alkali carbonate, which was obtained in each of Examples III-1 to III-6, was markedly larger than that of the carbon dioxide gas absorbent not containing an alkali carbonate, which was obtained Examples III-8, supporting that the absorbents for Examples III-1 to III-6 absorbed a large amount of a carbon dioxide gas even where the carbon dioxide concentration is low.

It is also seen that the carbon dioxide gas absorbent obtained in Example III-3 was superior to the absorbent obtained in Example III-7 in the carbon dioxide gas absorption capability, though these Examples III-3 and III-7 were equal to each other in the raw material composition. It is considered reasonable to understand that the carbon dioxide gas absorption capability of the absorbent for Example III-7 was lowered because the lithium carbonate powder, the potassium carbonate powder, and the silicon dioxide powder were heated simultaneously.

Incidentally, Comparative Examples III-1 and III-2 were intended to examine the changes in the absorption characteristics of the lithium zirconate-based carbon dioxide gas absorbent caused by the presence or absence of an alkali carbonate. As apparent from the experimental data, the addition of an alkali carbonate permits increasing the absorbed amount of a carbon dioxide gas. However, the rate of increase is low, compared with the lithium silicate-based carbon dioxide gas absorbent of the present invention.

Further, each of the carbon dioxide gas absorbents for Example III-3 and Comparative Example III-2 was held at 500° C. for 3 hours while circulating a mixed gas consisting of 98% by volume of a nitrogen gas and 2% by volume of a carbon dioxide gas through the carbon dioxide gas absorbent at a flow rate of 300 mL/min. The increase in the weight of the absorbent after the test was obtained by a thermogravimetric analysis, and the rate of increase in the weight of the absorbent, i.e., the value obtained by dividing the weight increase by the weight before the measurement and denoted by percentage (%), was measured based on the weight increase obtained by the thermogravimetric analysis. Table 4 shows the results:

TABLE 4

| | Kind of alkali carbonate | Lithium silicate: alkali carbonate | Weight increase rate |
|---|---|---|---|
| Example III-3 | $K_2CO_3$ | 1:0.2 | 17 |
| Comparative Example III-2 | $K_2CO_3$ | 1:0.2 | 2 |

As apparent from Table 4, the weight increase rate for the lithium silicate-based carbon dioxide gas absorbent obtained in Example III-3 is higher than that for the lithium zirconate-based carbon dioxide gas absorbent obtained in Comparative Example III-2. In other words, the experimental data support that the absorbent for Example III-3 is capable of absorbing a large amount of a carbon dioxide gas even where the carbon dioxide concentration is low.

As described above, the third embodiment of the present invention provides a carbon dioxide gas absorbent exhibiting a high carbon dioxide gas absorption power even where the carbon dioxide gas concentration is low.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A carbon dioxide gas absorbent containing
    lithium silicate; and
    an alkali carbonate selected from the group consisting of sodium carbonate and potassium carbonate, wherein the lithium silicate is represented by the general formula:

$Li_xSi_yO_z$ where x in the general formula is an integer of at least 4, and x, y and z are integers meeting the requirement of x+4y–2z=0.

2. The carbon dioxide gas absorbent according to claim 1, wherein the lithium silicate is in the form of a porous body.

3. The carbon dioxide gas absorbent according to claim 2, wherein the porous body contains particles having an average particle diameter of 0.1 to 5 mm.

4. The carbon dioxide gas absorbent according to claim 2, wherein the porosity of the porous body is in a range from 30% to 50%.

5. The carbon dioxide gas absorbent according to claim 1, further comprising at least one element as an auxiliary component selected from the group consisting of Al, K, Mg, Ca, Na, Fe, Ti and C.

6. The carbon dioxide gas absorbent according to claim 5, wherein the content of the auxiliary component is not higher than 5 wt %.

7. A carbon dioxide gas absorbent containing lithium silicate powder having an average particle diameter of 0.1 to 50 μm and represented by the general formula:

$Li_xSi_yO_z$ where x in the general formula is an integer of at least 4, and x, y and z are integers meeting the requirement of x+4y–2z=0, wherein
    the carbon dioxide gas absorbent further comprises an alkali carbonate selected from the group consisting of sodium carbonate and potassium carbonate.

8. The carbon dioxide gas absorbent according to claim 7, wherein the lithium silicate powder is in the form of a porous body.

9. The carbon dioxide gas absorbent according to claim 8, wherein the porosity of the porous body is in a range from 30% to 50%.

10. The carbon dioxide gas absorbent according to claim 7, further comprising at least one element as an auxiliary component selected from the group consisting of Al, K, Mg, Ca, Na, Fe, Ti and C.

11. The carbon dioxide gas absorbent according to claim 10, wherein the content of the auxiliary component is not higher than 5 wt %.

12. The carbon dioxide gas absorbent according to claim 7, wherein the average particle diameter of the lithium silicate powder is in a range from 0.5 to 10 μm.

13. A carbon dioxide gas absorbent containing porous lithium silicate particles having an average particle diameter in a range from 0.1 to 5 mm and represented by the general formula:

$Li_xSi_yO_z$ where x in the general formula is an integer of at least 4, and x, y and z are integers meeting the requirement of x+4y–2z=0, wherein
    the carbon dioxide gas absorbent further comprises an alkali carbonate selected from the group consisting of sodium carbonate and potassium carbonate.

14. The carbon dioxide gas absorbent according to claim 13, wherein the porosity of the porous lithium silicate particles is in a range from 30 to 50%.

15. The carbon dioxide gas absorbent according to claim 13, further comprising at least one element as an auxiliary component selected from the group consisting of Al, K, Mg, Ca, Na, Fe, Ti and C.

16. The carbon dioxide gas absorbent according to claim 15, wherein the content of the auxiliary component is not higher than 5 wt %.

17. A carbon dioxide gas absorbent containing lithium silicate represented by the general formula:

$Li_xSi_yO_z$ where x in the general formula is an integer of at least 4, and x, y and z are integers meeting the requirement of x+4y–2z=0,
    wherein the carbon dioxide gas absorbent is in the form of a porous molded body; and
    the carbon dioxide gas absorbent further comprises an alkali carbonate selected from the group consisting of sodium carbonate and potassium carbonate.

18. The carbon dioxide gas absorbent according to claim 17, wherein the porosity of the porous molded body is in a range from 30% to 50%.

19. The carbon dioxide gas absorbent according to claim 17, further comprising at least one element as an auxiliary component selected from the group consisting of Al, K, Mg, Ca, Na, Fe, Ti and C.

20. The carbon dioxide gas absorbent according to claim 19, wherein the content of the auxiliary component is not higher than 5 wt %.

21. The carbon dioxide gas absorbent according to claim 1, wherein the content of said alkali carbonate is 5 to 30 mol %.

22. The carbon dioxide gas absorbent according to claim 21, wherein the content of said alkali carbonate is 10 to 20 mol %.

23. The carbon dioxide gas absorbent according to claim 7, wherein the content of said alkali carbonate is 5 to 30 mol %.

24. The carbon dioxide gas absorbent according to claim 23, wherein the content of said alkali carbonate is 10 to 20 mol %.

25. The carbon dioxide gas absorbent according to claim 13, wherein the content of said alkali carbonate is 5 to 30 mol %.

26. The carbon dioxide gas absorbent according to claim 25, wherein the content of said alkali carbonate is 10 to 20 mol %.

27. The carbon dioxide gas absorbent according to claim 17, wherein the content of said alkali carbonate is 5 to 30 mol %.

28. The carbon dioxide gas absorbent according to claim 27, wherein the content of said alkali carbonate is 10 to 20 mol %.

* * * * *

UNITED STATES PATENT AND TRADEMARK OFFICE
CERTIFICATE OF CORRECTION

PATENT NO. : 6,387,845 B1  Page 1 of 1
DATED : May 14, 2002
INVENTOR(S) : Kato et al.

It is certified that error appears in the above-identified patent and that said Letters Patent is hereby corrected as shown below:

<u>Title page, Item [54] and Column 1, line 1,</u>
Should read: -- CARBON DIOXIDE GAS ABSORBENT --

<u>Title page,</u>
Items [12] and [75], should read:
-- [12]  United States Patent
         Kato et al.

[75]   Inventors:    Masahiro Kato, Naka-gun; Kazuaki Nakagawa, Yokohama-shi; Toshiyuki Ohashi, Kawasaki-shi; Sawako Yoshikawa; Kenji Essaki, both of Yokohama-shi, all of (JP) --

Items [45] and [*], should read:
-- [45]  Date of Patent:     * May 14, 2002
   [*]   Notice:    Subject to any disclaimer, the term of this patent is extended or adjusted under 35 U.S.C. 154(b) by 0 days.

This patent issued on a continued prosecution application filed under 37 CFR 1.53(d), and is Subject to the twenty year patent term provisions Of 35 U.S.C. 154(a)(2). --

Signed and Sealed this

Twenty-sixth Day of August, 2003

JAMES E. ROGAN
*Director of the United States Patent and Trademark Office*